Oct. 7, 1969 F. R. QUINN 3,471,088
VALVE CONTROL MECHANISM
Filed Aug. 1, 1967 2 Sheets-Sheet 1
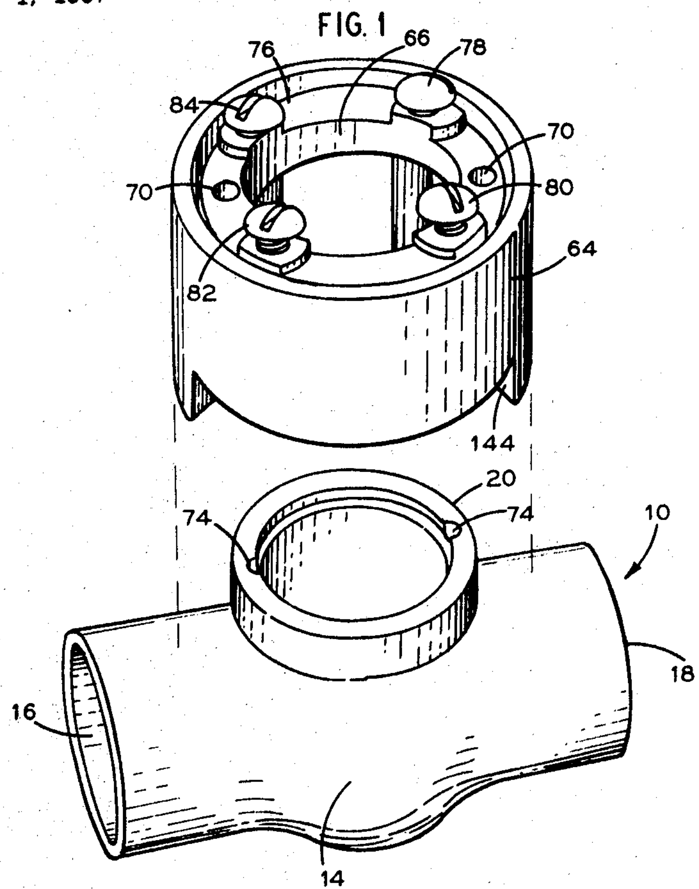
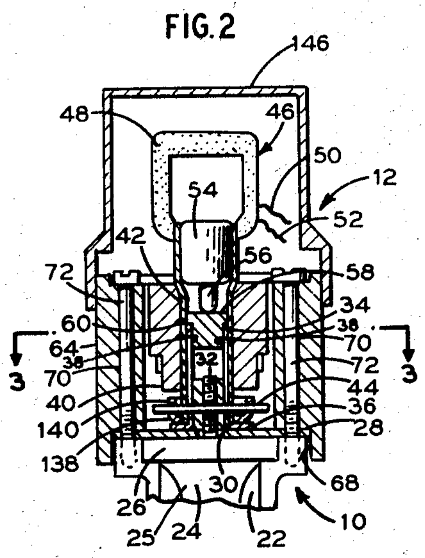
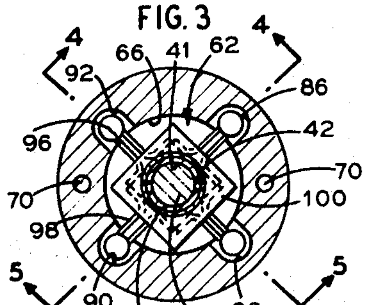
INVENTOR.
Frederic R. Quinn
BY Irving Seidman
ATTORNEY VALVE CONTROL MECHANISM
Filed Aug. 1, 1967 2 Sheets-Sheet 2
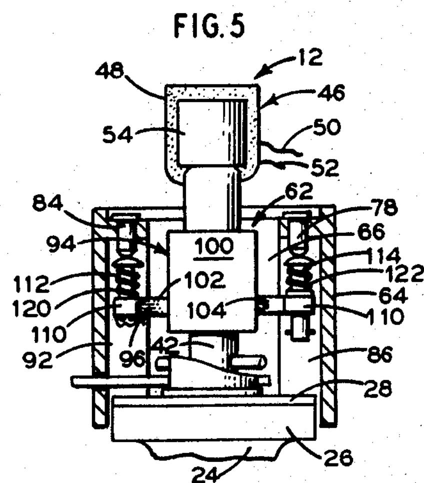
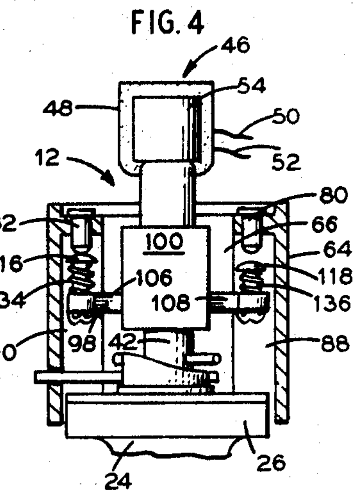
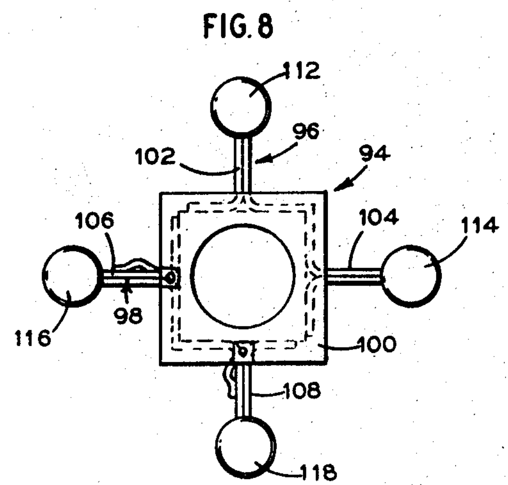
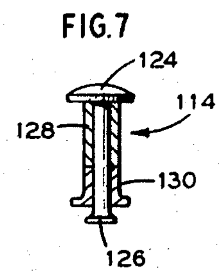
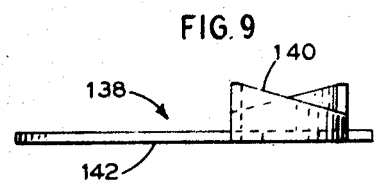
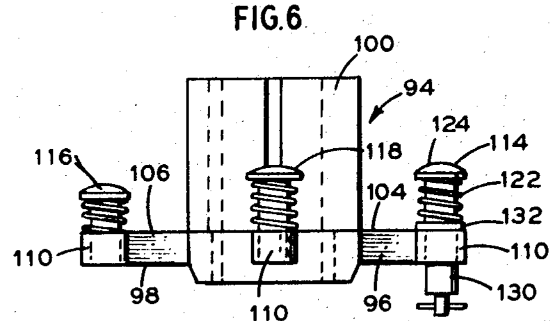
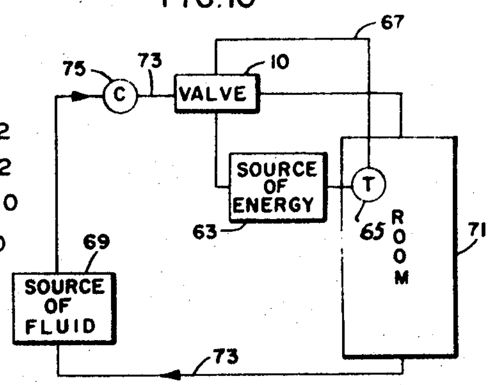

United States Patent Office 3,471,088
Patented Oct. 7, 1969

3,471,088

VALVE CONTROL MECHANISM

Frederic R. Quinn, Red Hook, N.Y., assignor to Zyrotron Industries, Inc., Red Hook, N.Y., a corporation of New York Filed Aug. 1, 1967, Ser. No. 657,636
Int. Cl. G05d 23/185, 23/19; F16k 31/04
U.S. Cl. 236—68 9 Claims

ABSTRACT OF THE DISCLOSURE

A valve control mechanism for moving a valve member between a valve-open and a valve-closed position comprising a movable member connected to the valve member for moving the valve member between the open and closed positions. Electrically operated actuating means is provided for operating the movable member. A first pair of unconnected contacts are connected between a source of energy and the actuating means. Carried on the movable member is a second pair of contacts which is positioned to connect together the first pair of contacts when the valve is in the valve-closed position and to break the circuit between the first pair of contacts when the movable member has moved the valve member to the valve-open position thereby to deenergize the actuating means. Accordingly, the control mechanism provides a simple and efficient means for controlling the operation of the valve.

This invention relates to a control mechanism for a valve and, more particularly, pertains to a control mechanism for a valve which may be mounted directly on the valve to provide an efficient and compact means for controlling the operation of the valve.

Valve control mechanisms presently utilized to operate a valve between its open and closed positions suffer from a number of drawbacks. Foremost among the disadvantages of such mechanisms is their unusually large size. For example, a solenoid-actuated valve requires a winding which is sufficiently large to produce a magnetic field capable of effectuating operation of the valve. This factor, of necessity, requires an extremely large control mechanism. Other drawbacks associated with presently available valve control mechanisms include the complexity of the valve control mechanism and, therefore, the relatively high cost of the same. Moreover, since most of these control mechanisms have a number of moving elements, they are continuously subject to faulty operation and present problems when they are serviced.

Accordingly, it is an object of the present invention to provide a control mechanism for a valve which is compact in size an doccupies a minimum amount of space.

Another object of the present invention is to provide a valve control mechanism which is reliable in operation and may be replaced easily thereby eliminating service problems.

A further object of the present invention resides in the novel details of construction which provide a valve control mechanism of the type described which is inexpensive to produce.

Another object of this invention is the provision of a control mechanism for a valve which has a minimum of moving elements.

In furtherance of the above objects, the control mechanism of the present invention comprises moving means movable between a first and a second position for moving a valve between a valve-open and a valve-closed position. Actuating means responsive to an electric signal is connected to said moving means for operating the moving means between said first and second positions. Switch means operable by said moving means is provided for connecting the actuating means with an electric signal source when the moving means is in one of said first and second positions and for disconnecting the actuating means from the electric signal source when the moving means is in the other of said positions.

Other features and advantages of the present invention will become more apparent from a consideration of the following detailed description when taken in conjunction with the accompanying drawings, in which:

FIG. 1 is an exploded perspective view illustrating the relationship between a valve body and the valve control mechanism contact support;

FIG. 2 is a vertical sectional view of a valve control mechanism constructed according to the present invention;

FIG. 3 is a sectional view thereof taken along the line 3—3 of FIG. 2;

FIG. 4 is a partial sectional view thereof taken along the line 4—4 of FIG. 3;

FIG. 5 is a partial sectional view thereof taken along the line 5—5 of FIG. 3;

FIG. 6 is a front elevational view of the movable switching assembly, to an enlarged scale;

FIG. 7 is a detailed sectional view of a contact in said switching assembly;

FIG. 8 is a top plan view of the switching assembly;

FIG. 9 is a front elevational view of a lever for manually operating the valve; and FIG. 10 is a block diagram of a system using a valve constructed according to the present invention.

In the description of the valve control mechanism which follows hereinbelow, it will be assumed that the valve control mechanism is utilized in conjunction with a so-called snap-acting valve of the type described and illustrated in my U.S. Patent No. 3,107,894, issued on Oct. 22, 1963. This type of valve comprises a valve body having a fluid inlet chamber and a fluid outlet chamber separated by a partition having a fluid opening therein. The opening is selectively closed by a resilient valve member which normally seats on the fluid opening under the influence of a biasing force produced by a resilient diaphragm. An appropriate valve actuating member is provided for operating the valve member to an unseated or a valve-open position to permit the flow of a fluid through the valve. However, it is to be noted that this valve is used for illustrative purposes only and is not to be interpreted as being a limitation of the present invention. That is, the valve control mechanism of the present invention may be utilized in conjunction with any type of valve for moving the valve between a valve-open and a valve-closed position.

FIGS. 1 and 2 show portions of a snap-acting valve 10 of the type shown and described in the aforementioned patent which mounts a valve control mechanism designated generally by the reference numeral 12. The valve 10 comprises a T-shaped valve body 14 which includes an inlet end 16 and an outlet end 18 which are adapted to be connected to suitable conduits (not shown). The stem portion 20 of the valve body 14 communicates with the inlet end 16 and defines a fluid chamber 22 in which a valve member 24 having a vertical shaft 42 embedded therein is reciprocally mounted.

A partition (not shown) normally separates the inlet end 16 from the outlet end 18 of the valve 10. The valve member 24 normally seats in an aperture or opening which is provided in the partition to connect the inlet and outlet ends of the valve. The valve control mechanism 12 is operable to unseat or move the valve member 24 to the valve-open position by causing the valve member to move upwardly thereby unseating it from the aperture in the partition. Accordingly, fluid will then flow through the valve from the inlet end 16 to the outlet end 18.

The valve member 24 is preferably formed of a resilient material such as rubber, neoprene, or the like. The member 24 comprises a plug end portion (not shown), a valve stem 25 connected thereto, and a diaphragm or spring disc 26 connected to the upper end of the valve stem. The diaphragm 26 is designed to impart a biasing characteristic to the valve member 24 so that the plug end of valve member will always seat on the aperture in the partition to close the same and prevent communication between the inlet end 16 and the outlet end 18 of the valve 10.

Thus, it is to be noted that the valve member 24 of the valve 10 may be operated between the valve-open and a valve-closed position to control the flow of fluid through the valve body 14. If more information on the operation of this valve is desired, the reader is referred to my aforementioned patent.

The valve control mechanism 12 of the present invention includes a supporting plate 28 which seats on the valve body stem portion 20. The supporting plate 28 is provided with a central through bore 30. The upper surface of the diaphragm 26 abuts the undersurface of the plate 28, as shown in FIG. 2. The shaft 32, which is embedded in the valve member 24 and which is operable to move the valve member to the valve-open position when the shaft is moved upwardly, is received through the bore 30. Upstanding from the supporting plate 28 and centrally located thereon is a hollow post 34 having a bottom radial flange 36. The post 34 may be permanently connected to the supporting plate 28 by welding or the like. Provided in the post are diametrically opposed slots 38 which extend to the top edge of the post.

A spacer 30 is slidingly received within the post 34 and receives the shaft 32 in a central through bore 41 to maintain a coaxial relationship between the shaft 32 and the post 34.

Surrounding the post 34 and in slidable engagement therewith is a moving member or tube 42 which extends beyond the top edge of the post 34. Provided in the tube 42, the spacer 40 and the shaft 32 are aligned bores which receive a laterally extending pin 44. The pin 44 is received in the opposed slots 38 in the post 34 and extends beyond the tube 42, as shown in FIG. 2.

As the tube 44 is moved upwardly the shaft 32 is similarly moved upwardly because of the connection between the tube 42 and the shaft 32 via the pin 44. Accordingly, it will be obvious that the upward movement of the tube 42 will cause movement of the valve member 24 to the valve-open position. On the other hand, movement of the tube 42 downwardly will cause the valve member 24 to be moved to the valve-closed position. The slots 38 in the post 34 prevent the rotation of the pin 44 and, consequently, the tube 42 or the spacer 32.

Movement of the tube 42 is effectuated by an actuating means which is designated generally by the reference numeral 46. The actuating means 46 is described more fully in my copending application entitled "Snap Acting Valve and Control Mechanism Therefor," Ser. No. 596,954, filed Nov. 25, 1966. More particularly, the actuating means 46 includes a ceramic resistor 48 of known construction which is commercially available. The ceramic resistor 48 is adapted to be connected to an energy source by the leads 50 and 52. When the ceramic resistor 48 is energized, it produces and stores heat within its ceramic coating. Embedded within the ceramic resistor and extending below the same is a piston cylinder 54, a portion of which is received in an enlarged diameter end of the tube 42. More specifically, the end of the tube 42 is crimped or otherwise connected to the piston cylinder 54 to prevent relative movement between the piston cylinder and the tube.

Received within the piston cylinder 54 is a piston 56 the lower end of which is in engagement with a bearing surface 58 of a stop member 60. The stop member 60 includes a lower reduced diameter portion which is received within the hollow post 34 and an upper enlarged diameter portion, the undersurface of which rests on the top edge of the post 34 to mount the stop member 60 thereon.

Also received within the piston cylinder 54 and abutting the edge of the piston 56 is a temperature-responsive element (not shown). The temperature-responsive element is preferably of the type disclosed in Patent No. 2,259,846, issued to S. Vernet et al. on Oct. 21, 1941. This material is adapted to expand rapidly and to contract rapidly when the ambient temperature respectively rises above or falls below a preselected level.

The operation of the control mechanism 12 thus far described is as follows. When the energy is applied to the ceramic resistor 48 via the leads 50 and 52, the temperature surrounding the piston cylinder 54 begins to increase. Accordingly, the temperature-responsive element within the piston cylinder begins to expand thereby causing the piston 56 to move outwardly. Since the piston cylinder 54 and the tube 42 are connected together and the bearing surface 58 is stationary, the piston cylinder, and, therefore, the tube 42 will move upwardly. As noted above, upward movement of the tube 42 causes the valve member 24 to move to the valve-open position. When the supply of energy to the ceramic resistor 48 is cut off, the resistor cools and the temperature responsive element contracts. Accordingly, the piston cylinder 54 and the utbe 42 move downwardly thereby returning the valve member 24 to the valve-closed position.

The control mechanism 12 of the present invention further comprises a switching assembly which is designated generally by the reference numeral 62. The switching assembly 62 is adapted to control the energization of the ceramic resistor 48 of the actuating means 46. Additionally, the switching assembly 62 may be utilized to control an external circuit such as a circulator in a heating or cooling system, as noted in detail below. The switching assembly 62 includes a housing or stationary contact support member 64 having a central bore 66. A recess 68 (FIG. 2) is provided in the bottom of the housing 64 so that the housing seats on the supporting plate 28 to limit the downward movement of the housing 64 relative to the valve body stem 20. Provided in the housing 64 are apertures 70 which receive respective screws 72. The screws 72 pass through appropriate apertures in the supporting plate 28 and are threadedly received in appropriate bores 74 in the valve stem 20 to secure the housing 64 on the valve body 14. The housing 64 is further provided with a top recess 76 the bottom of which receives circumferentially spaced screw terminals or contacts 78, 80, 82 and 84. A portion of the housing 64 is cut away beneath each one of the respective screw terminals 78–84 to defines respective vertical recesses 86, 88, 90, and 92 as shown in FIGS. 3, 4 and 5.

Carried on the tube 42 is a movable contact assembly designated generally by the reference numeral 94. The movable contact assembly 94 includes an electrically conducting band 96 and an electrically conducting band 98 which are received within an insulating plastic block 100 which is fixedly mounted on the tube 42 and is movable therewith. In other words, the block 100 insulates the conducting bands 96 and 98 from the tube 42. The band 96 includes outwardly extending arms 102 and 104 which are transverse to each other and which are respectively received in the recesses 92 and 86. Similarly, the conducting band 98 includes outwardly extending arms 106 and 108 which are respectively received in the recesses 90 and 88. Each one of the arms 102–108 terminates in a circular portion 110. Slidably received in each of the circular portions 110 of the respective arms 102–108 are respective rivets or contacts 112–118. Accordingly, it will be appreciated now that the band 96 electrically connects together the rivets 112 and 114 and that the band 98 electrically connects together the rivets 116 and 118.

As shown in FIG. 5, the movable contact assembly 94 is sized and positioned so that the rivets 112 and 114 normally engage the screw terminals 84 and 78 to electrically connect together these terminals. Springs 120 and 122 normally bias the heads of the rivets 112 and 114 upwardly so that the rivets are maintained in contact with the terminals 84 and 78.

The rivet 114 is shown in detail in FIG. 7 and includes a head 124 and a depending central member or shaft 126. Surrounding the upper portion of the member 126 is an insulating sleeve 128. Surrounding the lower portion of the member 126 is a conducting sleeve 130 which provides a path for the flow of current through the head 124 and a member 126 to the conducting band 96.

In operation, the lead 52 of the ceramic resistor 48 is connected to the screw terminal 84 of the switching assembly 62. A source of energy such as source 69 of FIG. 10 is connected between the screw terminal 78 and the lead 52 of the ceramic resistor 48. When an external switch, such as a thermostat 65 in room 67 is closed a circuit is completed from the source of energy 63 to the ceramic resistor 48 through the terminal 84 and a lead 67, the rivet 112, the conducting band 96, the rivet 114 and the terminal 78. Accordingly, the actuating means 46 will be operated to cause the tube 42 to move upwardly to move the valve member 24 to the valve-open position.

As the tube 42 moves upwardly the conducting band 96 is similarly carried upwardly. The rivets 112 and 114 which are movable in the circular portions 110 will accordingly move downwardly relative to the arms 102 and 104 of the band 96. As the rivet 114 moves downwardly the conducting sleeve 130 of the rivet moves out of contact with the circular portion 110 of the arm 104 and into contact with the insulating sleeve 128. The sleeve 128 is sized so that when the valve member 24 has been moved to the full valve-open position, the conducting sleeve 130 will have moved out of contact with the circular portion 110 of the band 96 and the insulating sleeve 128 will be received in the circular portion 110 thereby to insulate the rivet 114 from the conducting band 96. Additionally, a fiber washer 132 is received between the spring 122 and the band 96 to prevent the transfer of current from the rivet head 124 to the band 96 via the spring 122.

Accordingly, it will now be apparent that as the valve member is moved to the valve-open position the circuit between the actuating means 46 and the source of energy is broken. To put this in another way, the normally unconnected terminals 84 and 78 are connected in a series loop with the actuating means 46 and a source of energy by the movable contact assembly 94. That is, the terminals 84 and 78 are connected together by means of the rivets 112 and 114 and the conducting band 96 of the moving contact assembly 94 thereby to energize the actuating means. However, when the valve moves to the full valve-open position, the connection between the rivet 114 and the conducting band 96 will open thereby to break the circuit and de-energize the actuating means to prevent further heating of the ceramic resistor 48. Additionally, if the valve 10 is connected in a system similar to the system shown in FIG. 10, which includes a temperature changing source of fluid 69 connected to a heating means in room 71 and back to the source via a conduit 73, the valve will control the flow of fluid. However, when the ceramic resistor begins to cool and the piston 56 begins to retract into the piston cylinder 54 so that the tube 42 moves downwardly, the conducting sleeve 130 of the rivet 114 will again move into contact with the circular portion 110 of the arm 104. Accordingly, the energizing circuit for the actuating means will again be reestablished thereby to heat the ceramic resistor 48 and maintain the valve in the valve-open position.

Hence, when energy is applied to the ceramic resistor 48 from an external circuit, the valve will move to the valve-open position and the switching assembly 62 will maintain the valve in this position. However, it is to be noted that the tube 42 will oscillate slightly due to the fact that the rivet 114 will continuously be moving into and out of electrical contact with the band 96. However, the length of the rivet 114 is selected so that the valve will always remain in the full valve-open position regardless of the fact that the tube 42 may hunt slightly.

As noted hereinabove, the rivets 116 and 118 are adapted to contact and connect together the terminals 82 and 80, respectively. However, as shown in FIG. 4, the rivet 118 is slightly smaller than the rivet 116 and is spaced below the terminal 80. The terminals 82 and 80 may be connected in series with an external circuit which is to be controlled by the valve mechanism 12. For example, the valve mechanism 12 may be incorporated in the heating or cooling system which includes circulator 75. The actuating mechanism 46 may be controlled by the thermostat 65 in the manner indicated above to open the valve to permit the flow of the temperature changing fluid when the temperature rises above a preselected level or falls below a preselected level depending upon whether the valve is used in conjunction with a heating or a cooling system. The normally unconnected terminals 80 and 82 may be connected in a circuit (not shown) which includes the circulator 75 and a source of energy for the circulator.

It will be obvious that as the tube 42 moves upwardly the rivet 118 will move in contact with the terminal 80 thereby establishing a complete circuit between the normally unconnected terminals 82 and 80 through the rivet 116, the band 98, and the rivet 118. Moreover, the rivets or the screw terminals may be sized so that the external circuit will be completed prior to the movement of the valve member to the fully valve-open position. In other words, the external circuit may be energized before the valve has moved to the full valve-open position. In the example illustrated, this means that the circulator will be energized as soon as the valve 10 has begun to open.

It is to be noted that biasing springs 134 and 136 are provided about the respective rivets 116 and 118 and perform the same function as the biasing springs 112 and 114. Moreover, the biasing springs 112, 114, 134 and 136 further add a safety feature to the valve of the present invention by insuring that in case of failure of any of the elements the valve will be returned to the valve-closed position. That is, if the valve is in the open position and the source of energy to the actuating means 46 fails, the ceramic resistor 48 will cool and the tube 42 will move downwardly, thereby returning the valve member 24 to the valve-closed position. However, there is a possibility that the valve member will not seat firmly in the orifice in the partition thereby allowing some fluid to leak through the valve. However, the springs 112, 114 and 134 exert a downward force on the tube 42 thereby causing the tube 42 to move the valve member 24 to the full valve-closed position so that if the valve control mechanism 12 should fail, the valve member will automatically be moved to the fully valve-closed position.

Accordingly a valve control mechanism has been described which is compact thereby requiring a minimum amount of space and which contains a minimum number of moving parts thereby to decrease the possibility of failure.

The present invention further provides means for manually moving the valve to the valve-open position. Accordingly, a manually operable member 138 is provided (FIG. 9) which is adapted to be received about the tube 42 and which rests on the radial flange 36 of the post 34. The member 138 is provided with an upper cam surface 140 which engages the pin 44. The member 138 further includes a lever 142 which extends outwardly through an opening 144 in the housing 64. The cam surface 140 slopes upwardly so that when the lever 142 is moved from one end of the opening 144 to the other the cam surface will ride on the pin 44 thereby causing the pin 44 to ride upwardly on the raised portion of the cam surface to move the tube 42 upwardly thereby to cause the member 24 to move to the valve-open position.

As shown in FIG. 2, the terminals and the actuating member 46 may be protected by a cap 146 which is removably mounted on the top of the housing 64.

While a preferred embodiment of the invention has been shown and described herein, it will become obvious that numerous omissions, changes and additions may be made in such embodiment without departing from the spirit and scope of the present invention.

What is claimed is:

1. A control mechanism for a valve comprising moving means movable between a first and a second position for moving the valve between a valve-closed and a valve-open position, actuating means responsive to an electric signal for operating said moving means between said first and second positions, and switch means operable by said moving means for connecting said actuating means with an electric signal circuit when said moving means is in one of said first and second positions and for disconnecting said actuating means from an electric signal circuit when said moving means is in the other of said positions, said switch means including movable contact means mounted on said moving means, and stationary contact means positioned to be engaged by said movable contact means when said moving means is in said one position to establish a complete circuit between said actuating means and the electric signal circuit through said movable and stationary contact means, said stationary contact means including a pair of unconnected stationary contacts mounted on a valve, lead means for connecting said pair of stationary contacts in a series loop which includes said actuating means and an electric signal circuit, said movable contact means including a pair of connected contacts each one of which is positioned to engage a respective one of said pair of stationary contacts when said moving means is in said one position, whereby said stationary contacts are connected together, said movable contact means further including a conducting band mounted on said moving means for supporting and electrically connecting together said pair of contacts, one of said contacts being movable between a first position in which said one contact is electrically connected with said band and a second position in which said one contact is insulated from said band, said contact normally being in said first position when said moving means is in said one position and being adapted to be moved to said second position when said moving means is moved to said other position.

2. A control mechanism as in claim 1, in which said one contact of said movable contact assembly includes a conducting shaft, the upper portion of said shaft including an insulating member and the lower portion of said shaft including a conducting member in electrical contact with said band, said shaft being positioned to engage a respective one of said pair of stationary contacts as said moving means moves from said one to said other position, whereby said shaft is depressed with respect to said band so that said band is moved out of contact with the lower portion of said shaft and into contact with said insulating portion of said shaft to break the electrical circuit between said pair of stationary contacts.

3. A mechanism as in claim 1, and control means operable by said moving means for completing an electric circuit between a source of energy and a preselected apparatus as said moving means moves from said one position to said other position, said control means including at least a first electrically conductive contact mounted on the valve and a second electrically conductive contact on said moving means positioned to engage said first contact so that a circuit is closed through said first and second contacts prior to the movement of said moving means to the other position.

4. A mechanism as in claim 1, in which said actuating member includes a piston cylinder, a piston slidably received in said piston cylinder and movable between an extended and a retracted position relative to said cylinder, said piston cylinder being connected to said moving means, stop means normally engaging said piston when said piston is in said retracted position, an element thermostatically expandable in response to a preselected temperature received in said piston chamber and operatively associated with said piston to move said piston to said extended position whereby said moving means is moved to said second position, and heating means in heat exchanging relationship with said element for raising temperature of said element to said preselected temperature, whereby said heating element is adapted to be energized when said switch means is in said first position.

5. A mechanism as in claim 1, and manually operable means connected to said moving means for manually moving said moving means from said first to said second position.

6. A control device for a valve of the type having a valve member movable between a valve-opened and valve-closed position, said control device including moving means adapted to be connected to the valve member and being movable between a first and a second position for moving the valve member between the opened and closed positions, electro-mechanical means operatively associated with said moving means and being responsive to an electric signal to operate said moving means, a first set of unconnected contacts adapted to be mounted on said valve, lead means for connecting said first set of contacts between said electro-mechanical means and a source of current, a second set of serially connected contacts on said moving means, one of said second set of contacts being movable between one position in which it is electrically connected with said other contact of said second set to connect together said first set of contacts when said moving means is in said first position corresponding to the valve-closed position and a second position in which it is insulated from said other contact to break the circuit between said first set of contacts when said moving means is in the second position corresponding to said valve-opened position, whereby said electro-mechanical means is de-energized when said moving means is in said second position, and a removable housing adapted to be mounted on the valve, said housing receiving said first set of contacts therein in overlying relationship to said second set of contacts for supporting and maintaining said first set of contacts on the valve.

7. A device as in claim 6, and a third set of unconnected contacts on said housing, and a fourth set of serially connected contacts on said moving means positioned to engage and connect together said third set of contacts when said moving means moves from said first to said second position, whereby said third and fourth set of contacts are adapted to control an external circuit after said moving means has moved from said first position.

8. A device as in claim 6, in which said second set of contacts includes a conducting band on said moving means for supporting and electrically connecting together a pair of terminals, one of said pair of terminals being movable between a first position in which said one terminal is in electrical contact with said band and a second position in which said one terminal is out of electrical contact with said band to break the electrical circuit between said pair of terminals, said one terminal normally being in said first position when said moving means is in said first position and being movable to said second position when said moving means is in said second position.

9. A system for controlling the ambient temperature of a room and the like comprising a source of fluid for changing the temperature of the room, a conduit to provide a passage for said fluid from said source through the room and back to said source, circulator means for circulating said fluid through said conduit, a valve in said conduit having a valve member movable between a valve-open and a valve-closed position for controlling the flow of said fluid through said conduit, valve control means mounted on said valve to control the operation of said valve, a source of energy, and a thermostat responsive to a preselected temperature for connecting said source of energy with said valve control means; said valve control means comprising moving means connected to said valve member and being movable between a first and a second position for respectively moving said valve member between said valve-closed and said valve-open position, actuating means for moving said moving means from said first to said second position, and switch means connected in a series loop with said actuating means, said switch means being operable by said moving means for connecting said actuating means with said thermostat and said source of energy when said moving means is in said first position and for breaking said series loop when said moving means is in said second position, said system further including control means responsive to the movement of said moving means from said first to said second position to connect said source of power with said circulator to energize said circulator, said switch means including a movable contact assembly on said moving means and a pair of stationary contacts on said valve, said movable contact assembly comprising a pair of contacts connected by a band mounted on said moving means, each one of said movable contact assembly contacts being positioned to engage a respective one of said pair of stationary contacts, one contact of said movable contact assembly pair of contacts including a conducting shaft, the upper portion of said shaft including an insulating member and the lower portion of said shaft including a conducting member in electrical contact with said band, said shaft being positioned to engage a respective one of said pair of stationary contacts as said moving means moves from said first to said second position, whereby said shaft is depressed with respect to said band so that said band is moved out of contact with the lower portion of said shaft and into contact with said insulating portion of said shaft to break the electrical circuit between said pair of stationary contacts.

References Cited

UNITED STATES PATENTS

| | | | |
|---|---|---|---|
| 3,168,805 | 2/1965 | Fleury | 236—68 X |
| 3,206,117 | 9/1965 | Anderson. | |
| 3,254,183 | 5/1966 | Quinn. | |
| 3,273,850 | 9/1966 | Kolze | 251—11 |
| 3,317,135 | 5/1967 | Feinberg | 236—68 |
| 3,326,510 | 6/1967 | Kolze | 251—11 |

EDWARD J. MICHAEL, Primary Examiner

U.S. Cl. X.R.

251—11